United States Patent [19]

Kinerk et al.

[11] Patent Number: 5,561,738
[45] Date of Patent: Oct. 1, 1996

[54] DATA PROCESSOR FOR EXECUTING A FUZZY LOGIC OPERATION AND METHOD THEREFOR

[75] Inventors: Keith E. Kinerk; Joseph P. Magliocco; Hoang K. Quan; David A. Pena, all of Austin, Tex.

[73] Assignee: Motorola, Inc., Schaumburg, Ill.

[21] Appl. No.: 217,786

[22] Filed: Mar. 25, 1994

[51] Int. Cl.$^6$ ........................................... G06G 7/00
[52] U.S. Cl. .................................. 395/3; 395/900
[58] Field of Search ........................ 395/3, 10–11, 395/51, 61, 900, 76, 60; 326/59; 364/746.2, 773, 800

[56] References Cited

U.S. PATENT DOCUMENTS

| | | | |
|---|---|---|---|
| 4,620,188 | 10/1986 | Sengchanh | 326/59 |
| 4,628,435 | 12/1986 | Tashiro et al. | 364/130 |
| 4,918,620 | 4/1990 | Ulug | 364/513 |
| 4,961,225 | 10/1990 | Hisano | 380/28 |
| 5,036,730 | 8/1991 | Sakai et al. | 74/866 |
| 5,058,033 | 10/1991 | Bonissone et al. | 364/513 |
| 5,165,011 | 11/1992 | Hisano | 395/54 |
| 5,168,549 | 12/1992 | Takagi et al. | 395/3 |
| 5,170,357 | 12/1992 | Sasaki et al. | 364/471 |
| 5,175,795 | 12/1992 | Tsuda et al. | 395/3 |
| 5,179,634 | 1/1993 | Matsunaga et al. | 395/75 |
| 5,263,135 | 11/1993 | Viot et al. | 395/51 |
| 5,280,624 | 1/1994 | Ikeda | 395/3 |
| 5,295,229 | 3/1994 | Viot et al. | 395/51 |
| 5,371,832 | 12/1994 | Eichfeld et al. | 395/3 |
| 5,412,752 | 5/1995 | Basehore et al. | 395/3 |

FOREIGN PATENT DOCUMENTS

| | | |
|---|---|---|
| 557675A1 | 2/1992 | European Pat. Off. . |
| 93108532 | 5/1993 | European Pat. Off. ........ G05B 13/02 |

OTHER PUBLICATIONS

Takagi et al, "A Canonical disjunctive form of extended kleene-stone logic functions"; Proceedings of the twenty-third international symposium on multiple-valued logic, pp. 36–41, 24–27 May 1993.

Dettloff et al, "A fuzzy logic controller with reconfigurable, cascadable architecture"; Proceedings. 1989 IEEE international conference on computer design: VLSI in computers and processors, pp. 474–478, 2–4 Oct. 1989.

Morisue et al, "A superconducting fuzzy processor"; IEEE International conference on fuzzy systems, pp. 443–450, 8–12 Mar. 1992.

Proc. of the Int'l Conf. on Fuzzy Systems, San Francisco, Mar. 28–Apr. 1, '93, IEEE, "Architecture of a PDM VLSI Fuzzy Logic Controller with Pipelining and Optimized Chip area," by Ungering et al.

Proc. of the Int'l Workshop on Neural Networks and Their Appl. (Neuro-Nimes '89) of Nov. 13–16, '89 in Nimes, France, "Une Approche Connexionniste Pour Calculer L'Implication . . ." by Giambiasi et al.

(List continued on next page.)

Primary Examiner—David K. Moore
Assistant Examiner—Tariq Hafiz
Attorney, Agent, or Firm—Elizabeth A. Apperley

[57] ABSTRACT

A fuzzy inference engine (10) performs fuzzy logic operations with a high degree of accuracy in a minimal amount of time. The fuzzy inference engine (10) includes a fuzzification module (12) which decodes an input signal to access a memory location (18, 20). When accessed, the memory location provides a unary value to a rule evaluation module (26). The rule evaluation module (26) subsequently processes the unary value to indicate a relative strength of a fuzzy inference rule. Because the fuzzy logic operations use unary numbers, rather than more traditional binary numbers, the only time required to perform fuzzy logic operations is equal to only a time required for the signal to propagate through the logic gates (28, 30, 32, 34, 36, and 38) forming rule evaluation module (26).

23 Claims, 4 Drawing Sheets

OTHER PUBLICATIONS

"Implementing Fuzzy Expert Rules in Hardware" in the Apr. 1992 issue of AI Expert, vol. 7, No. 4, pp. 25 through 31, written by James M. Sibigtroth.

"Creating Fuzzy Micros" in the Dec. 1991 issue of Embedded Systems Programming, vol 4, No. 12, pp. 1–10, written by James M. Sibigtroth.

User's Manual entitled "FP-3000 Digital Fuzzy Processor User's Manual" published by OMRON Corporation.

Reference Manual entitled "FIDE" published by Aptronix in 1992, pp. 1–20.

"A VLSI Fuzzy Logic Controller with Reconfigurable, Cascadable Architecture" in the Apr. 1990 issue of IEEE Journal of Solid–State Circuits, vol. 25, No. 2, pp. 376–382.

"An Optimization Approach for Fuzzy Controller Design" in the Proc. of the 1990 American Control Conf. . , San Diego CA., May 23–25, 1990, pp. 1485–1490.

"Fuzzy Logic Controller Structures" published in SPIE vol. 1381 Intelligent Robots and Computer Vision IX: Algorithms and Techniques (1990), pp. 368–378.

"Designing with Fuzzy Logic" in the Nov. 1990 issue of IEEE Spectrum, pp. 42–44, 105.

5,561,738

DATA PROCESSOR FOR EXECUTING A FUZZY LOGIC OPERATION AND METHOD THEREFOR

FIELD OF THE INVENTION

This invention relates generally to a data processor, and more particularly to a data processor for executing a fuzzy logic operation.

BACKGROUND OF THE INVENTION

Fuzzy logic in data processing systems was developed to overcome problems which were difficult to solve with traditional control and decision making techniques because of the imprecise, vague, and incomplete nature of available information. Fuzzy logic combines the ideas of fuzzy sets and expert systems and uses them as tools to model and control complex processes, thereby providing a way of teaching a data processor to mimic the human intuition in control and decision making processes. Fuzzy sets allow the expression of any condition in terms of degrees of truth or membership which can vary from zero (false or no membership) to one (true or complete membership).

A fuzzy logic control engine consists of three major blocks: a fuzzification block, a rule evaluation block, and a defuzzification block. The fuzzification block takes several external inputs and compares each to a plurality of predefined membership functions (each membership function is a fuzzy set) to determine the degree of membership of each of the inputs in each membership function. Once the degrees of membership of the inputs have been determined, the rule evaluation block determines the appropriate response to the inputs according to a set of rules. Rules are constructed using IF, AND, and THEN statements. The AND operation performs a MIN function in which a minimum value is selected. A typical rule may appear as follows:

IF temperature is very hot AND heater output is average, THEN turn heater output to minimum.

Each rule in a fuzzy evaluation system is implemented in a consequent block in the rule evaluation block. When several rules are implemented, the outputs of the consequent blocks are logically summed in the rule evaluation block to combine the results of all the rules. The logical sum operation is a MAX function in which a maximum value of the plurality of consequent blocks is determined. The defuzzification block subsequently converts the output of the rule evaluation block into a format usable by the external system.

In general, implementations of a fuzzy logic inference engine vary widely in terms of inferendng speed, flexibility, and cost. Inference speed is a measure of how long the output of a fuzzy logic inference engine requires to change in response to changing inputs to the fuzzy logic inference engine. Flexibility is a measure of how well an inference engine can be configured to achieve optimal performance and cost. Some examples of fuzzy logic inference engines include the Omron FP-3000 digital fuzzy processor, the Aptronix FIDE software inference engines, and the VLSI fuzzy logic controller by Hiroyuki Watanabe, et. al.

The Omron FP-3000 digital fuzzy processor is a sixty four pin integrated circuit that can perform one complete fuzzy inference in 0.65 millisecond for 5 inputs, 2 outputs, and 20 rules at a 24 MHz operating frequency. In this implementation, inputs to the digital fuzzy processor are processed in parallel. For each input, rule evaluation is performed sequentially until all rules have been evaluated. Defuzzification is performed using either a center of gravity technique or a max-height technique. These techniques are well-known in the data processing art and will not be discussed in detail herein.

The VLSI fuzzy logic controller designed by Watanabe is an eighty four pin integrated circuit which can perform 580 inferences per millisecond for 102 rules operating at 36 MHz clock frequency. This fuzzy chip consists of a host interface, a fuzzifier, an inference engine, and a defuzzifier. A three stage pipeline is used to increase inference speed from input fuzzifier to defuzzifier. The host interface is used to download rules into memory at a starting time and then dynamically between inference operations. The fuzzifier consists of a large counter-addressed RAM (random access memory) which stores the values of membership functions. Each membership function uses 32 bytes (64 by 4 bits) of RAM. During operation, the inputs are sampled every 64 clock cycles and used as starting addresses containing membership values. Only one membership value is presented to the inference engine for rule evaluation at a time. MIN and MAX operations are performed once all membership values have been provided to the rule block. Defuzzification provides a result of the rule evaluation operation to an external system.

Software implementations of fuzzy logic inference engines such as the Aptronix's FIDE package compile rules and membership functions for use in various general purpose microcontrollers. In the FIDE implementation, the type of microcontroller chosen will determine the number of rules, the shapes and resolution of membership functions, and the number of inputs and outputs. Since all inference operations are done sequentially, inference time will increase when rules or membership functions are added. For a typical 8-bit microcontroller, calculating the membership value of one fuzzy input for one membership function takes eighty-eight CPU (central processing unit) timing cycles. At a 4 MHz bus speed, fuzzification time for a two input system with seven membership functions per input requires over 300 microseconds to execute each rule.

Perhaps the biggest drawback of the prior art systems described above is the inference speed. The purely software implementation of the fuzzy logic inference engine performs most slowly since it does not exploit any parallel processing features which normally exist in fuzzy logic inference engines. The two hardware implementations of fuzzy logic inference engines by Omron and Watanabe do take advantage of parallel processing to some extent. The architecture of both the Omron and Watanabe implementations require circuits which are shared among the input fuzzification and the rule evaluation blocks. Therefore, all signal paths which go through the common circuitry must be serialized and will, therefore, take more time to perform a fuzzy inference operation. Watanabe partially overcame this throughput problem through the use of pipelining. Inference speed for all three systems is dependent on the number of inputs, the number of rules, and the number of membership functions. As the system increases in size and complexity, the inference time slows down.

SUMMARY OF THE INVENTION

The previously mentioned needs are fulfilled with the present invention. Accordingly, there is provided, in a first form, a method for performing a fuzzy logic operation. In the fuzzy logic operation, a first input signal is received and decoded to access a first plurality of memory locations in a first membership function memory. A first fuzzy input value is retrieved in unary form from a first one of the first plurality of memory locations. The first fuzzy input value indicates a degree of membership of the first input signal in a first membership function. The first fuzzy input value is used to provide a first minimum value, subsequently and.

In a second embodiment of the invention, a data processor is provided. The data processor includes a first address decoder which receives a first input signal and decodes the first input signal to provide a first decoded signal. The data processor also includes a first memory having a first plurality of memory locations. The first memory is connected to the first address decoder to receive the first decoded signal. The first memory provides a first fuzzy input value in unary form from a first one of the first plurality of memory locations indicated by the first decoded signal. A first logic circuit selectively performs a first logic function using the first fuzzy input value. The first logic circuit is connected to the first memory for receiving the first fuzzy input value and the first logic circuit provides a first minimum value. A second logic circuit selectively performs a second logic function using the first minimum value. The second logic circuit is connected to the first logic circuit for receiving the first minimum value. The second logic circuit provides a first output value.

These and other features, and advantages, will be more clearly understood from the following detailed description taken in conjunction with the accompanying drawings. It is important to note the drawings are not intended to represent the only form of the invention.

DETAILED DESCRIPTION OF A PREFERRED EMBODIMENT

Figure 1:
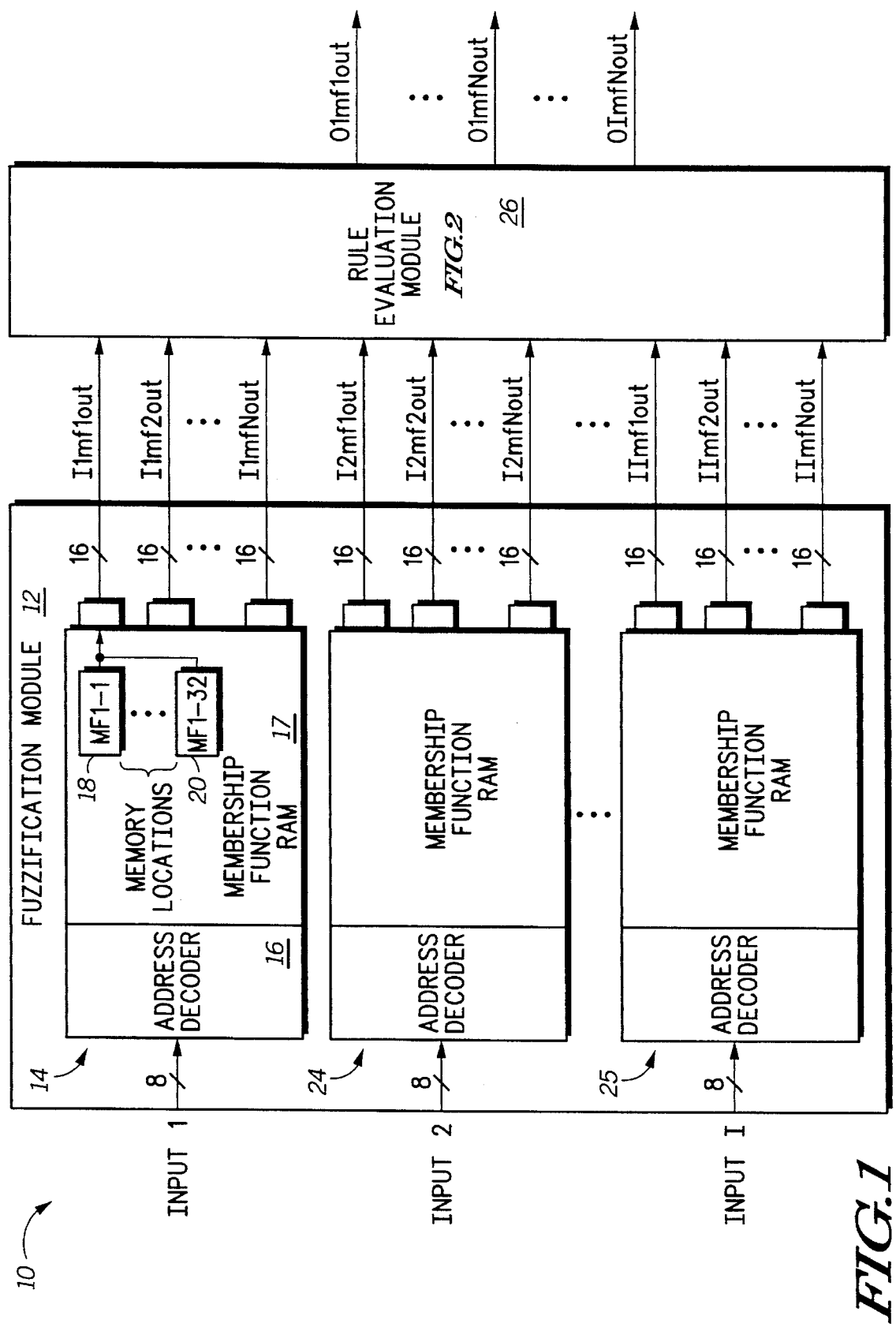
FIG. 1 illustrates in block diagram form a fuzzy inference system in accordance with the present invention.

The present invention provides a fuzzy inference engine which performs fuzzy logic operations with a high degree of accuracy in a minimal amount of time. The high speed of the present fuzzy inference engine architecture is achieved by performing all fuzzy logic operations in a unary number system, rather than a more traditional binary number system. Because the fuzzy inference engine performs all fuzzification and rule evaluation steps in unary, the only time required to perform each of these steps is equal to only a time required for the signal to propagate through the logic gates forming the fuzzy inference engine. No circuitry requiring clocks or timing is involved during execution of the fuzzification and rule evaluation steps and therefore, the fuzzy inference engine is not limited by the speed at which it may be clocked. Rather the fuzzy inference engine is limited only by the intrinsic delay of the logic circuitry therein.

In contrast, each of the prior art solutions involves a serial approach to fuzzifying a plurality of inputs and subsequently applying a rule base to a resulting plurality of fuzzified inputs. Therefore, the total inference time for fuzzifying and evaluating each of the plurality of inputs is proportional to a number of input membership functions and a number of rules in the rule base. The present fuzzy inference engine has an architecture which is parallel in nature and, thus, significantly shortens the total inference time for fuzzifying and evaluating each of the plurality of inputs. In a fuzzification module of the fuzzy inference engine, a membership value of a first input in each of a plurality of membership functions is evaluated in parallel with all other inputs. The fuzzified inputs are then simultaneously provided to a rule evaluation module of the fuzzy inference engine. The rule evaluation module receives the plurality of parallel inputs and generates a plurality of fuzzy outputs, also in parallel.

Furthermore, the fuzzification module of the present invention is very flexible when defining a shape of each of the plurality of input membership functions. In the present embodiment of the invention, the input membership functions may be any shape desired by a user of the fuzzy inference engine. In one embodiment of the present invention, the fuzzification module may be implemented using RAM or EPROM (electrically programmable read only memory) during development of the fuzzy inference system, then using ROM (read only memory) for a final design in silicon. Additionally, the rule evaluation module of the present invention flexibly defines a fuzzy rule base. Any number of rules, inputs, and outputs may be provided by the present invention and is limited only on an availability of silicon area. A number of levels of fuzzy membership may also be easily increased or decreased. Logic optimization for the MAX and MIN inferencing results in the rule evaluation module using a smallest possible amount of circuit area and, therefore, decreases the overhead costs of the present invention. Furthermore, the rule evaluation module may also be used with a software inference engine. The rule evaluation module may evaluate a rule base in less time than is required for a typical CPU cycle, thereby greatly reducing the dependence between fuzzy inference time and a number of rules in the rule base. Additionally, in the present invention, all fuzzy outputs are concurrently provided in parallel. Operation of the fuzzy logic system of the present invention will subsequently be discussed in greater detail.

Additionally, during a following description of the implementation of the invention, the terms "assert" and "negate," and various grammatical forms thereof, are used to avoid confusion when dealing with a mixture of "active high" and "active low" logic signals. "Assert" is used to refer to the rendering of a logic signal or register bit into its active, or logically true, state. "Negate" is used to refer to the rendering of a logic signal or register bit into its inactive, or logically false state.

DESCRIPTION OF CONNECTIVITY

FIG. 1 illustrates a fuzzy logic inference system 10. Fuzzy logic inference system 10 includes a fuzzification module 12 and a rule evaluation module 26. Fuzzification module 12 includes a plurality of membership function circuits 14, 24, and 25. Included in membership function circuit 14 is an address decoder 16 and a membership function RAM 17 having a plurality of memory locations (MFI-1 through MFI-32) 18 through 20. While a remaining portion of the plurality of membership function circuits 24 and 25 are not illustrated in detail, it should be noted that each of the plurality of membership function circuits is configured similarly to membership function circuit 14.

Membership function circuit 14 receives an Input 1 signal which is eight bits wide. The Input 1 signal is provided to address decoder 16. Memory location (MFI-1) 18 is coupled to rule evaluation module 26 to selectively provide a "I1mf1out" signal. Additionally, each of a remaining portion of the plurality of memory locations through memory location (MF1-32) 20 is coupled to rule evaluation module 26 to selectively provide the I1mf1out signal. Each of a plurality of outputs provided by each of the remaining portion of the plurality of memory locations (not shown in detail herein) are respectively labeled "I1mf2out" through "I1mfNout."

Similarly, membership function circuit 24 receives an Input 2 signal which is eight bits wide. The Input 2 signal is provided to an address decoder. A membership function RAM of membership function circuit 24 provides a plurality of outputs provided by each of the remaining portion of the plurality of memory locations are respectively labeled "I2mf2out" through "I2mfNout." As well, membership function circuit 25 receives an Input I signal which is eight bits wide. The Input I signal is provided to an address decoder. A membership function RAM of membership function circuit 25 provides a plurality of outputs provided by each of the remaining portion of the plurality of memory locations are respectively labeled "IImf2out" through "IImfNout." It should be noted herein that "N" indicates a number of possible membership functions and that "I" indicates a number of inputs to fuzzy inference system 10.

In response to receiving each of the I1mf1out through I1mfNout, I2mf1out through I2mfNout, and IImf1out through IImfNout signals, rule evaluation module 26 provides a plurality of signals respectively labeled O1mf1out through OImfNout.

Figure 2:
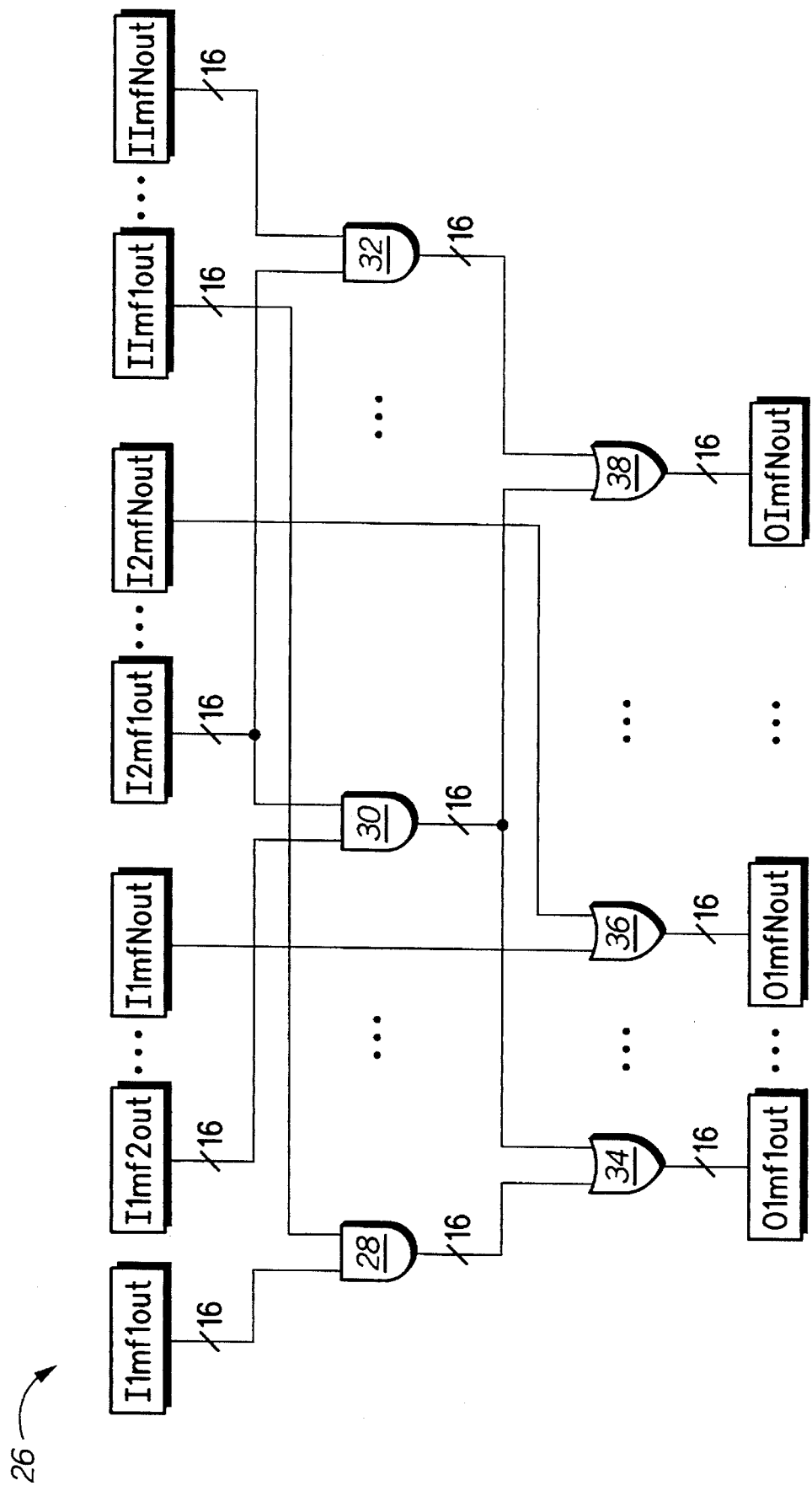
FIG. 2 illustrates in partial logic diagram form a rule evaluation module of FIG. 1.

Rule evaluation module 26 is illustrated in greater detail in FIG. 2. Rule evaluation module 26 generally comprises an AND gate 28, an AND gate 30, an AND gate 32, an OR gate 34, an OR gate 36, and an OR gate 38. It should be understood that similar configurations of AND and OR gates are required for all of the inputs to rule evaluation module 26, but have not been included in FIG. 2 for simplicity and clarity.

In rule evaluation module 26, the sixteen bit wide I1mf1out signal is provided to a first input of AND gate 28 and the sixteen bit wide I1mf2out signal is provided to a first input of AND gate 30. A remaining portion of signals from I1mf3out (not shown) to I1mNout are connected to AND gates not shown in FIG. 2. Similarly, the sixteen bit wide I2mf1out signal is provided to a second input of AND gate 30 and a first input of AND gate 32. A remaining portion of signals from I2mf2out (not shown) to I2mNout are connected to AND gates not shown in FIG. 2. The sixteen bit wide IImf1out signal is provided to a second input of AND gate 28 and the IImfNout signal is provided to a second input of AND gate 32. As has been previously mentioned, a remaining portion of signals provided by fuzzification module 12 are connected to AND gates which are not illustrated in FIG. 2.

An output of AND gate 28 is provided to a first input of OR gate 34. An output of AND gate 30 is provided to both a second input of OR gate 34 and a first input of OR gate 38. An output of AND gate 32 is provided to a second input of OR gate 38. OR gate 36 is coupled to fuzzification module 12 of FIG. 1 to receive the I1mfNout and I2mfNout signals. OR gate 34 provides the O1mf1out signal, OR gate 36 provides the O1mfNout signal, and OR gate 38 provides the OImfNout signal.

Operation of each of the embodiments of the present invention will subsequently be discussed in more detail.

DESCRIPTION OF OPERATION

The present fuzzy inference engine 10 performs fuzzy logic operations with a high degree of accuracy in a minimal amount of time. The high speed of attained by fuzzy inference engine 10 is attributed to an architecture which performs all fuzzy logic operations in a unary number system, rather than a more traditional binary number system. Because the fuzzy inference engine performs all fuzzification and rule evaluation steps in unary, the only time required to perform each of these steps is equal to only a time required for the signal to propagate through the logic gates forming fuzzification module 12 and rule evaluation module 26 of fuzzy inference engine 10. No circuitry requiring clocks or timing is involved during execution of the fuzzification and rule evaluation steps and therefore, fuzzy inference engine 10 is not limited by the speed at which it may be clocked. Rather fuzzy inference engine 10 is limited only by the intrinsic delay of the logic circuitry therein.

Fuzzification is a first step in a fuzzy inference operation and is performed by fuzzification module 12 of fuzzy inference engine 10. During the fuzzification step, fuzzification module 12 converts an input value into N fuzzy membership values, where N is a number of membership functions defined in an input space. The N fuzzy membership values are then used during a fuzzy rule evaluation step in the fuzzy inference operation. In the present embodiment of the invention, each membership function is represented by 32 memory locations. Therefore, when there are 256 possible inputs, 32 of the inputs will access a particular membership function. An address decoder, such as 16, of the membership function RAM, such as 17, will determine which block of 32 inputs accesses each membership function stored in the membership function RAM. Membership values for inputs which do not address this block of 32 memory locations will default to a value of zero.

A generalized block diagram of fuzzification module 12 is shown in FIG. 1. Fuzzification module 12 receives a user defined number of eight bit binary inputs (referred to herein as Input1 through InputI) and provides a respective corresponding membership value for the inputs as sixteen bit unary values (respectively labeled, I1mf1out ... I1mfNout, I2mf1out ... I2mfNout ..., and IImf1out ... IImfNout). The number of membership values, N, is also user defined. Fuzzification module 12 includes a multi-output RAM memory, such as 17, having a block size 32*N×16 for each of the plurality of Input signals. During operation, memory portion 14 decodes the Input 1 signal, memory portion 24 decodes the Input2 signal, and memory portion 25 decodes the Input I signal. Each input to the fuzzification module is provided to the address decoder for the corresponding membership function RAM. For example, the Input 1 signal is input to address decoder 16 of memory portion 14. Similarly, the Input 2 signal is input to the address decoder of memory portion 24 and the Input I signal is input to the address decoder of memory portion 25. The address decoders map the plurality of input signals to 32 continuous memory locations for each membership function. For example, in memory portion 14, a first membership value of the Input 1 signal in a first membership function is stored in MFI-1, memory location 18, and a final membership value of the Input 1 signal in the first membership function is stored in memory location MF1-32. Depending on a value of the input signal provided to the membership function RAM, one of the 32 memory locations, or zero, will be stored in a corresponding RAM output for that membership function.

For example, the I1mf1out signal is the 16-bit output for a first membership function of memory portion 14. All outputs of fuzzification module 12 are provided as inputs to rule evaluation module 26.

The design of fuzzification module 12 reduces a fuzzification time to a minimum, thereby minimizing a total fuzzy inference time required by fuzzy inference engine 10. In this embodiment of the invention, inputs to fuzzification module 12 (Input 1, Input 2, through Input I) are eight bit binary numbers. Input 1, a first input signal, is decoded by address decoder 16 to access a plurality of membership functions. The decoded Input 1 signal is assigned a first membership value which corresponds to a first membership function. Similarly, for each membership function, the decoded Input 1 signal is assigned a membership value which corresponds to a respective one of the plurality of membership functions. In the present embodiment of the invention, the membership functions are stored in a multi-ported RAM, such as 17, which is accessed to indicate the membership values of the input signals. Upon determination of the membership value of the Input 1 signal in each of the plurality of membership functions, each of the membership values is output from one of a plurality of memory locations. The membership values are stored as sixteen bit unary numbers such that there are sixteen possible levels of membership in each membership function. This unary representation was chosen to increase the speed of the rule evaluation module described in the next section. Table 1 illustrates the unary representation of both decimal and binary numbers.

TABLE 1

| | Unary Number Representation | |
|---|---|---|
| Decimal | Binary | Unary |
| 0 | 0000 | 0000000000000000 |
| 1 | 0001 | 0000000000000001 |
| 2 | 0010 | 0000000000000011 |
| 3 | 0011 | 0000000000000111 |
| 4 | 0100 | 0000000000001111 |
| 5 | 0101 | 0000000000011111 |
| 6 | 0110 | 0000000000111111 |
| 7 | 0111 | 0000000001111111 |
| 8 | 1000 | 0000000011111111 |
| 9 | 1001 | 0000000111111111 |
| 10 | 1010 | 0000001111111111 |
| 11 | 1011 | 0000011111111111 |
| 12 | 1100 | 0000111111111111 |
| 13 | 1101 | 0001111111111111 |
| 14 | 1110 | 0111111111111111 |
| 15 | 1111 | 1111111111111111 |

Figure 4:
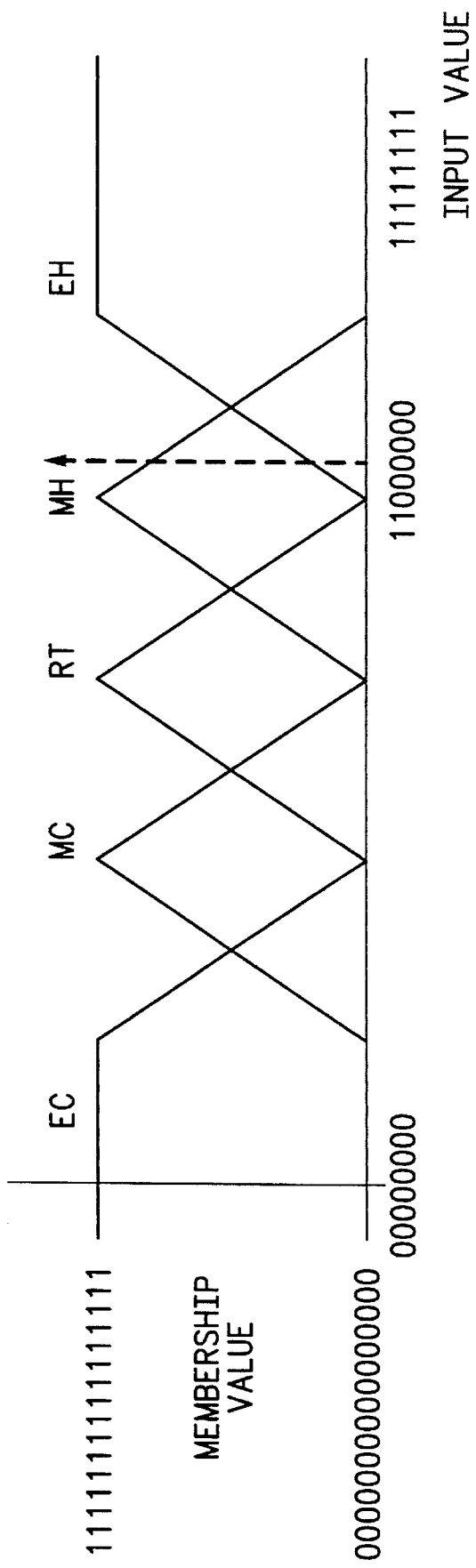
FIG. 4 provides a chart illustrating a step of determining a degree of membership in a membership function in a fuzzy inference system.

FIG. 4 provides an example which may provide clarification of the fuzzification operation. FIG. 4 illustrates a typical example fuzzification process for one input. Assume in this example, an eight bit input represents an output of a heat sensor which ranges from extremely cold (a binary value of 00000000) to extremely hot (a binary value of 11111111). The input space (as denoted by the X-axis) has been divided into five membership functions spanning an entire possible range of input values: Extremely Cold(EC), Mildly Cold(MC), Room Temp(RT), Mildly Hot(MH), and Extremely Hot(EH). The membership value (as denoted by the Y-axis) of a particular input can range from zero membership (a unary value of 0000000000000000) to complete membership (a unary value of 1111111111111111) with fourteen levels in-between. A shape of the membership functions shown in FIG. 4 are formed by a plurality of sets of 32 continuous unary values stored in a membership function RAM, such as membership function RAM 17 of FIG. 1. Referring again to FIG. 1, a start value for each membership function is determined by an address decode logic of the membership function RAM (address decoder 16 of memory portion 14 of FIG. 1 provides an example). The memory required to implement this example would be 160×16 bytes and would have five parallel output ports. For the sample input shown (binary 11000000), the five unary output values (corresponding to the level of membership in the five membership functions) is illustrated in Table 2.

TABLE 2

| Membership function | Unary output |
|---|---|
| EC | 0000000000000000 |
| MC | 0000000000000000 |
| RT | 0000000000000000 |
| MH | 0000111111111111 |
| EH | 0000000000001111 |

A next step in a fuzzy inference operation requires the fuzzified inputs to be evaluated to predetermined system rules. Rule evaluation requires a user definition of the rule base for a particular fuzzy application. A rule takes the form of an IF/THEN statement. Arguments which follow the IF statement are called antecedents and those that follow the THEN statement are referred to as consequents. A membership value that a given input has in a membership function is represented as a fuzzy input—the output of fuzzification module 12. If a given rule has multiple antecedents, the rule must specify whether they are AND'ed or OR'ed together to determine the effect on the consequent. The AND'ing of the antecedents is performed by the first level AND array of rule evaluation module 26. Antecedents that require OR'ing would be processed using an OR array. The outputs of the antecedent processing are the outputs of each independent rule. These outputs must then be applied to the consequents as specified by each rule. The consequents are OR'ed together to generate the fuzzy outputs, O1mf1out through OImfNout. The OR'ing of the consequents is performed by the second level OR array of rule evaluation module 26.

After execution of the fuzzification step, rule evaluation module 26 of FIG. 1 executes a rule evaluation step in the fuzzy inferencing process. As illustrated in FIG. 1, fuzzification module 12 provides fuzzified inputs, I1mf1out through IImfNout, to rule evaluation module 26. Outputs of rule evaluation module 26 are referred to as fuzzy outputs and are provided to an output defuzzifier (not shown herein). A software defuzzifier may also be used to perform the defuzzification process. FIG. 2 illustrates the internal circuitry of the Rule Evaluation Module 26. The fuzzified inputs, I1mf1out through IImfNout, received from fuzzification module 12 are provided to an AND array (AND gate 28, AND gate 30, and AND gate 32) according to user defined system rule base to perform a minimum (MIN) function on the fuzzified inputs. An AND function is equivalent to a MIN function when performed on unary numbers. The outputs of the AND array are then fed to an OR array (OR gate 34, OR gate 36, and OR gate 38) to perform a maximum (MAX) function on the data. An OR function is equivalent to a MAX function when performed on unary numbers. The output of the OR array provides the fuzzy outputs of the system, O1mf1out through OImfNout. Each Fuzzy output is a unary value representing the membership of a system output in that particular output membership function.

As an example, FIG. 2 provides logic circuitry the following rules:

Equation 1: IF (I1mf1out AND I1mf1out) THEN O1mf1out
Equation 2: IF (I1mf2out AND I2mf1out) THEN (O1mf1out AND OImfNout)
Equation 3: IF (I2mf1out AND IImfNout) THEN OImfNout
Equation 4: If (I1mfNout OR I2mfNout) then O1mfNout In a first rule, Equation 1, the fuzzy input, I1mf1out is AND'ed with the fuzzy input, IImf1out, by AND 28 (see FIG. 2). An output of this rule is applied to the O1mf1out output membership function using OR 34 (see FIG. 2). In the second rule, Equation 2, the fuzzy input, I1mf2out, is AND'ed with I2mf1out using AND 30. Equation 2 demonstrates how a rule may affect more than one output membership function. The AND'ing together of the consequents O1mf1out and OImfNout is implicit and does not require any additional OR or AND arrays. An output of the antecedent processing (first level AND array) is simply fed to more than one location in the second level OR array. Equation 3 AND's I2mf1out and IImfNout together using AND 32. Equation 3 is very similar to Equation 1. It is important to note that a logical reduction is possible by combining antecedents that affect a common consequent into a single rule. This reduction results in less hardware without compromising the performance of fuzzy inference system 10. A final rule, Equation 4, OR's the I1mfNout and the I2mfNout signals using OR gate 36. Equation 4 provides an example in which a fuzzy input directly affects a fuzzy output.

Figure 3:
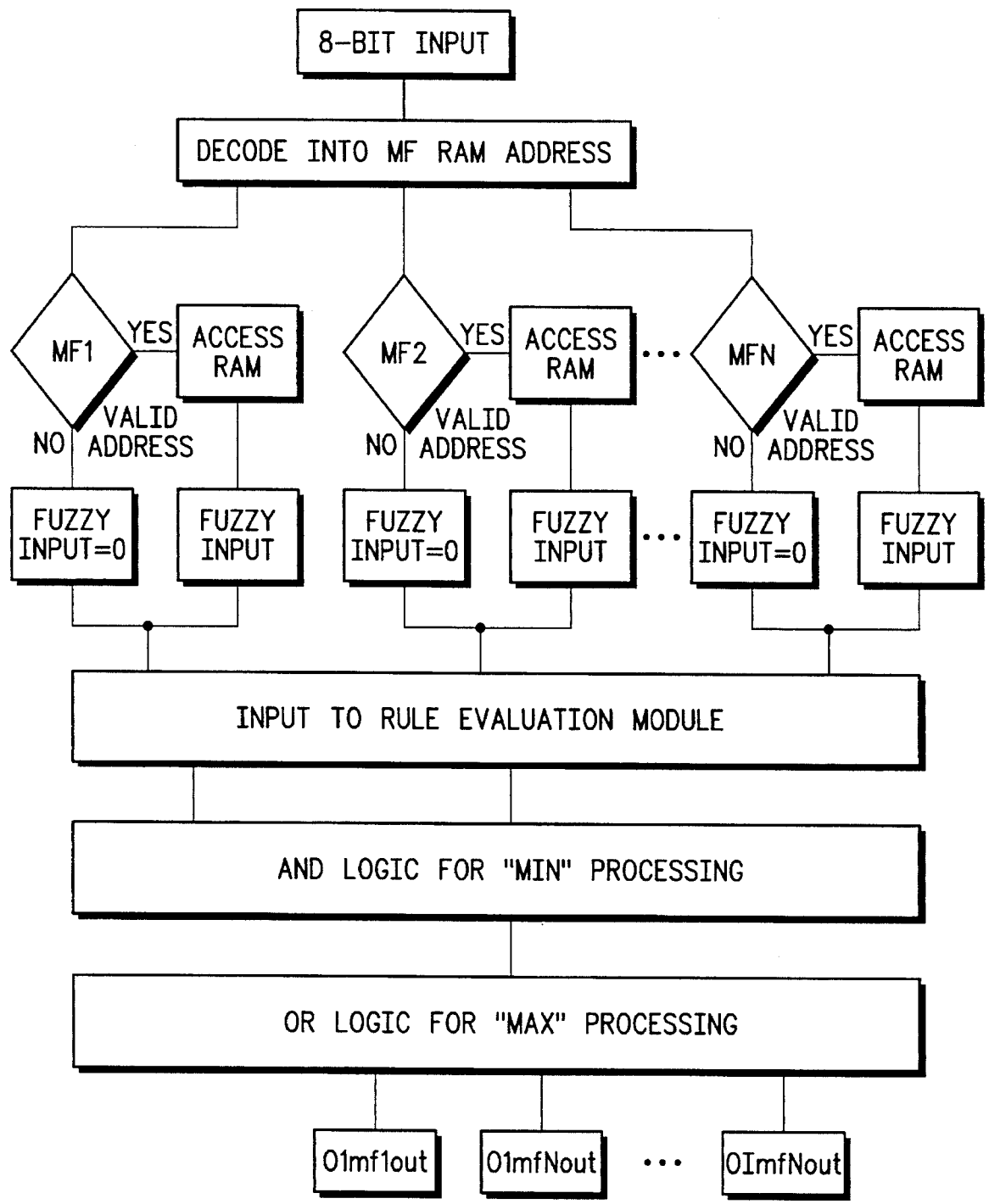
FIG. 3 illustrates in flow chart form a method for performing a fuzzy inference operation in accordance with the present invention.

FIG. 3 illustrates a flow chart which summarizes the operation of fuzzification module 12 and rule evaluation module 26. In FIG. 3, a digital input is provided to the fuzzification module 12. The digital input is then decoded into a plurality of membership function RAM addresses. For each membership function, the membership function RAM will be activated and will output the corresponding fuzzified input when the address is valid. If the address is not valid, the fuzzified input for that membership function will be zero. The fuzzy inputs are output in a unary format such as that shown in FIG. 1 and are subsequently provided to rule evaluation module 26.

In rule evaluation module 26, the fuzzy inputs are provided to the first level AND array (28, 30, and 32) in accordance with the rule base for the system. The outputs of the AND array are then applied to the second level OR array (34, 36, and 38) according to a user defined rule base. The outputs of the OR array are fuzzy outputs in a unary format and are ready to be defuzzified.

In summary, the present invention provides a fuzzy inference engine which performs fuzzy logic operations with a high degree of accuracy in a minimal amount of time. The high speed of the present fuzzy inference engine architecture is achieved by performing all fuzzy logic operations in a unary number system, rather than a more traditional binary number system. Because the fuzzy inference engine performs all fuzzification and rule evaluation steps in unary, the only time required to perform each of these steps is equal to only a time required for the signal to propagate through the logic gates forming the fuzzy inference engine. No circuitry requiring clocks or timing is involved during execution of the fuzzification and rule evaluation steps and therefore, the fuzzy inference engine is not limited by the speed at which it may be clocked. Rather the fuzzy inference engine is limited only by the intrinsic delay of the logic circuitry therein.

Furthermore, the fuzzification module of the present invention is very flexible when defining a shape of each of the plurality of input membership functions. In the present embodiment of the invention, the input membership functions may be any shape desired by a user of the fuzzy inference engine. In one embodiment of the present invention, the fuzzification module may be implemented using RAM or EPROM (electrically programmable read only memory) during development of the fuzzy inference system, then using ROM (read only memory) for a final design in silicon. Furthermore, storing membership function values in RAM allows the user to have the ability to have membership functions of arbitrary shape. The size and complexity of the address decode logic in the fuzzification module is also reduced by requiring the customer to define the membership function boundaries with software/hardware emulation prior to circuit fabrication. Therefore, the RAM address decode would be a customer specific logic block and would be regenerated via synthesis techniques for each application. Another advantage of the present design of the fuzzification module is that the membership values for all membership functions for the given input are accessed in parallel. The size of the fuzzification module depends on the number of inputs and the number of membership functions per input required by the user.

Additionally, the rule evaluation module of the present invention flexibly defines a fuzzy rule base. Any number of rules, inputs, and outputs may be provided by the present invention and is limited only on an availability of silicon area. A number of levels of fuzzy membership may also be easily increased or decreased. Logic optimization for the MAX and MIN inferencing results in the rule evaluation module using a smallest possible amount of circuit area and, therefore, decreases the overhead costs of the present invention. Furthermore, the rule evaluation module may also be used with a software inference engine. The rule evaluation module may evaluate a rule base in less time than is required for a typical CPU cycle, thereby greatly reducing the dependence between fuzzy inference time and a number of rules in the rule base. Additionally, in the present invention, all fuzzy outputs are concurrently provided in parallel. Operation of the fuzzy logic system of the present invention will subsequently be discussed in greater detail.

The implementation of the invention described herein is provided by way of example only. However, many other implementations may exist for executing the function described herein. Alternatives available within the fuzzification architecture disclosed in the present invention include an ability to double the apparent width of a membership function without adding any additional bytes of RAM. This ability is achieved by "don't caring" the least significant bit of the input in the address decoder. The apparent width of the membership function can be expanded even more by "don't caring" additional bits. Another alternative implementation of the present invention may include adding additional bytes of RAM to increase the width of membership functions. Therefore, with the sacrifice of a small amount of circuit area, a fuzzy inference system may have greater functionality. In another implementation of the present invention, the inputs and outputs may be represented in binary, unary, or binary encoded decimal depending on the requirements of the systems surrounding the fuzzification module.

Additionally, a programmable logic array may be used to implement a rule base and the address decoders of the membership functions such that custom circuitry may be tested and debugged prior to a circuit being implemented in silicon.

The membership function RAM may also require an interface to both a read/write data bus for initialization of data via a host and internal CPU capable of reformatting data for unary storage into the RAM. Additionally, an output precharged inverted data bus to drive the rule evaluation module may also be implemented. Both busses are required since the frequency for data access by the CPU and fuzzy output accesses by the Rule Block are very different.

Additionally, a second embodiment of the fuzzy inference engine might have at least one status control register (not shown herein) to allow a CPU or host processor to respond to particular events such as fuzzification complete and rule block complete. In a fuzzification complete operation, a status bit which reflected that the eight bit input is fuzzified would be provided and in a rule block complete operation, a status bit which reflected that the output of rule evaluation block 26 is ready for further processing would be provided. Other added features may include input out of range (depending on system definition by an external user), unary data error to detect invalid membership function definitions, and membership function dumps via the read/write CPU port.

Additionally, although the present fuzzy inference engine architecture includes a hardware implementations of the fuzzification and rule generation, these modules can be implemented in software. Trade-offs between hardware and software implementations include performance and cost.

If the fuzzification module was implemented in software, the sampled digital input checked against stored boundaries values of the membership functions. For comparing these values, memory select signals may be replaced with a writeable register with enable bits in a RAM memory. The software would enable only the RAM memory locations corresponding to membership functions which would have an effect on the fuzzified output. Similarly, if the rule evaluation module was implemented in software, a CPU interrupt when a fuzzification complete event occurs could be implemented. Unary fuzzy outputs could also be latched into data registers by this signal. The sixteen bit unary register values can be minimized and maximized by loading an accumulator with the stored data in the read/write registers. The registers would be dual ported registers to allow stimulating and testing of the Rule Block independent of the real fuzzified outputs. This also allows weighting of the fuzzified values at the input of rule evaluation module 26.

Furthermore, while the current design requires 8-bit parallel binary input data, the input data formats could be analog if processed by an Analog to Digital Converter, parallel unary, or serial unary/binary. When serial input data is provided to the fuzzy inference engine, defined protocols for inference engine addressing may be defined for multiple control systems using a shared data input bus.

Additionally, although a defuzzifier is not included in the present embodiment of the invention, a defuzzifier must be provided because no other external systems currently use a unary data format. Defuzzification time is approximately one microsecond and the defuzzifier output conversions may be analog, using unary to binary to analog, or a proportioned unary to binary value usable in binary algorithms.

The present embodiment of the fuzzy inference engine is flexible and fast enough to allow implementation within different microcontrollers architectures. These microcontrollers may include numerous central processing units, DMA's, and co-processors which share functionality and data with the inference engine. The fuzzy inference engine can also be implemented in either ROM or RAM memory devices, as well as more complex development system.

While there have been described herein the principles of the invention, it is to be clearly understood to those skilled in the art that this description is made only by way of example and not as a limitation to the scope of the invention. Accordingly, it is intended, by the appended claims, to cover all modifications of the invention which fall within the true spirit and scope of the invention.

We claim:

1. A method for performing a fuzzy logic operation, comprising the steps of:

receiving a first input signal;

decoding the first input signal to access a first plurality of memory locations in a first membership function memory when the first input signal is included in the first membership function;

retrieving a first fuzzy input value in unary form from a first one of the first plurality of memory locations, the first fuzzy input value indicating a degree of membership of the first input signal in a first membership function;

performing a first logic function selectively using the first fuzzy input value to provide a first minimum value; and performing a second logic function selectively using the first minimum value to provide a first output value.

2. The method of claim 1 wherein the first plurality of memory locations correspond to the first membership function.

3. The method of claim 1 further comprising the step of:

concurrently decoding the first input signal to access a second plurality of memory locations in the first membership function memory, the second plurality of memory locations corresponding to a second membership function.

4. The method of claim 3 further comprising the step of:

retrieving a second fuzzy input value in unary form from a first one of the second plurality of memory locations, the second fuzzy input value indicating a degree of membership of the second input signal in the second membership function.

5. The method of claim 4 further comprising the steps of:

performing the first logic function selectively using the first fuzzy input value and a second fuzzy input value to provide the first minimum value; and performing the second logic function selectively using the first minimum value and the second fuzzy input value to provide the first output value.

6. The method of claim 1 wherein the first fuzzy input value is equal to zero when the input signal is not included within the first membership function.

7. The method of claim 1 wherein the first logic function is an AND function.

8. The method of claim 1 wherein the second logic function is an OR function.

9. The method of claim 1 wherein the first membership function memory is a nonvolatile memory.

10. The method of claim 1 further comprising the steps of:

receiving a second input signal;

decoding the second input signal to access a first plurality of memory locations in a second membership function memory when the second input signal is included in the second membership function;

retrieving a second fuzzy input value in unary form from a first one of the first plurality of memory locations in the second membership function memory, the second fuzzy input value indicating a degree of membership of the second input signal in a second membership function;

performing the first logic function selectively using the first fuzzy input value and second fuzzy input value to provide a second minimum value; and performing the second logic function selectively using the first minimum value to provide a second output value.

11. A data processor, comprising:

a first address decoder for receiving a first input signal and decoding the first input signal to provide a first decoded signal when the first input signal is in a first membership function;

a first memory having a first plurality of memory locations, the first memory being coupled to the first address decoder for receiving the first decoded signal, the first memory providing a first fuzzy input value in unary form from a first one of the first plurality of memory locations indicated by the first decoded signal;

first logic means for selectively performing a first logic function using the first fuzzy input value, the first logic means being coupled to the first memory for receiving the first fuzzy input value and the first logic means providing a first minimum value; and second logic means for selectively performing a second logic function using the first minimum value, the second logic means being coupled to the first logic means for receiving the first minimum value and the second logic means providing a first output value.

12. The data processor of claim 11 wherein the first plurality of memory locations corresponds to the first membership function.

13. The data processor of claim 11 wherein the first memory further comprises a second plurality of memory locations, the first memory being coupled to the first address decoder for receiving the first decoded signal, the first memory providing a second fuzzy input value in unary form from a first one of the second plurality of memory locations indicated by the first decoded signal.

14. The data processor of claim 11 wherein the first fuzzy input value indicates a degree of membership of the first input signal in a first membership function.

15. The data processor of claim 11 further comprising:

a second address decoder for receiving a second input signal and decoding the second input signal to provide a second decoded signal when the second input signal is in a second membership function; and a second memory having a first plurality of memory locations, the second memory being coupled to the second address decoder for receiving the second decoded signal, the second memory providing a second fuzzy input value in unary form from a first one of the plurality of memory locations indicated by the second decoded signal.

16. The data processor of claim 11 wherein the first memory provides a second fuzzy input value in unary form from a second one of the plurality of memory locations indicated by the first decoded signal.

17. The data processor of claim 16 wherein the first logic function performed by the first logic means determines which of the first fuzzy input value and the second fuzzy input value has a lesser value and provides the lesser value as the first minimum value.

18. The data processor of claim 11 wherein the first fuzzy input value is equal to zero when the input signal is not included within the first membership function.

19. The data processor of claim 11 wherein the first logic function is an AND function.

20. The data processor of claim 11 wherein the second logic function is an OR function.

21. The data processor of claim 11 wherein the first memory is a nonvolatile memory.

22. A method for performing a fuzzy logic operation, comprising the steps of:

receiving a first input signal;

decoding the first input signal to access a first plurality of memory locations in a first membership function memory when the first input signal is included in the first membership function memory, the first plurality of memory locations corresponding to a first membership function;

retrieving a first fuzzy input value in unary form from a first one of the first plurality of memory locations, the first fuzzy input value indicating a degree of membership of the first input signal in the first membership function;

concurrently decoding the first input signal to access a second plurality of memory locations in the first membership function memory, the second plurality of memory locations corresponding to a second membership function;

retrieving a second fuzzy input value in unary form from a first one of the second plurality of memory locations, the second fuzzy input value indicating a degree of membership of the second input signal in the second membership function;

performing a first logic function selectively using the first fuzzy input value and a second fuzzy input value to provide a first minimum value; and performing a second logic function selectively using the first minimum value and the second fuzzy input value to provide a first output value.

23. The method of claim 22 further comprising the steps of:

concurrently receiving a second input signal;

decoding the second input signal to access a first plurality of memory locations in a second membership function memory when the second input signal is included in the second membership function memory;

retrieving a second fuzzy input value in unary form from one of the first plurality of memory locations in the second membership function memory, the second fuzzy input value indicating a degree of membership of the second input signal in a second membership function;

performing the first logic function selectively using the first fuzzy input value and second fuzzy input value to provide a second minimum value; and performing the second logic function selectively using the first minimum value to provide a second output value.

* * * * *